United States Patent [19]
Yoshibe et al.

[11] Patent Number: 5,956,530
[45] Date of Patent: Sep. 21, 1999

[54] LENS BARREL AND CAMERA SYSTEM TO OUTPUT DATA ABOUT A FOCAL LENGTH OF THE LENS BARREL

[75] Inventors: Koushi Yoshibe, Kawasaki; Yoshiharu Shiokama, Chiba-ken, both of Japan

[73] Assignee: Nikon Corporation, Tokyo, Japan

[21] Appl. No.: 08/730,380

[22] Filed: Oct. 15, 1996

[30] Foreign Application Priority Data

Oct. 18, 1995 [JP] Japan ................................. 7-293764

[51] Int. Cl.$^6$ .............................. G03B 7/02; G03B 15/02
[52] U.S. Cl. ................................. 396/62; 396/63; 396/79
[58] Field of Search .................................. 396/72, 79–82, 396/89, 91, 93, 61, 62, 63, 155, 159, 161; 359/642, 676, 683, 684, 686, 694, 695

[56] References Cited

U.S. PATENT DOCUMENTS 5,522,847  6/1996  Watanabe et al. ........................ 396/91

FOREIGN PATENT DOCUMENTS

62-196635  8/1987  Japan .

*Primary Examiner*—Safet Metjahic
*Assistant Examiner*—J. K. Han

[57] ABSTRACT

A lens barrel and a camera system are capable of precisely calculating a photographic magnification and a field range. The lens barrel having a focusing or zooming movable lens unit is stored with effective focal length data corresponding to a position of the movable lens unit, detects the position of the movable lens unit, outputs the corresponding effective focal length data and calculates the photographic magnification and the field range. An accuracy of a calculated value is thereby enhanced enough not to cause an underexposure on the whole or the underexposure in a peripheral portion as compared with a central portion.

21 Claims, 2 Drawing Sheets

LENS BARREL AND CAMERA SYSTEM TO OUTPUT DATA ABOUT A FOCAL LENGTH OF THE LENS BARREL

BACKGROUND OF THE INVENTION

1. Field of the Invention

The present invention relates generally to a lens barrel and a camera system and, more particularly, to a lens barrel and a camera system for outputting data about a focal length of the lens barrel.

2. Related Background Art

According to a prior art camera system, items of focal length data and photographic distance data of a lens barrel are inputted to a camera body side, and an exposure, an autofocus adjustment and a light emission of an electronic flash are controlled based on the focal length data and the photographic distance data. For example, a photographic magnification $\beta$ and a field range 1 are obtained in accordance with formulae (1) and (2) by use of semi diagonal line length h of a photographic surface of a film from a focal length f and a photographic distance R. The obtained photographic magnification p is used for making a photometric calculation for controlling the exposure. The field range 1 is used for calculating an electronic flash irradiation angle for controlling the light emission of the electronic flash.

$$\beta = f/R \quad (1)$$

$\beta$: photographic magnification,
f: focal length, and
R: photographic distance $$1 = R \times h/f \quad (2)$$

1: field range, and
h: semi diagonal line length of a photographic surface of a film (21.62 mm in a 35 mm film)

Note that the following relationship is established from the formulae (1) and (2).

$$1 = h/p \quad (3)$$

A nominal focal length is used for the focal length employed for the calculations in the formulae (1) and (2). The nominal focal length is a distance from a principal point to a focal point and, a light beam incident in parallel to the optical axis intersecting the optical axis at the focal point, is therefore equal to a distance between a film surface of a main point of the lens barrel when the lens barrel focalizes an object at the infinity. The nominal focal length takes one value in the case of a single focus lens barrel and a plurality of values in the case of a multi-focus lens barrel, and further takes a value falling within a predetermined range in the case of a zoom lens barrel.

Accuracies of controlling the exposure and the light emission of the electronic flash have been, however, increasingly demanded in recent years. With this demand, it is required that the focal length data of the lens barrel used should take a more precise value. For this purpose, when using the nominal focal length in a certain type of lens barrel, there might arise a problem in which the exposure and the light emission of the electronic flash can not be controlled at a high accuracy.

One of the causes of such a problem is that the nominal focal length of the lens barrel is not coincident with an effective focal length which will be mentioned later, and there exists the lens barrel having a large discrepancy between those values. Particularly in recent years, there has been developed a high performance zoom lens barrel having a large number of constructive lens elements, wherein the lens unit moving for zooming and the lens unit moving for focusing move in a complicated manner. Some of the above high performance zoom lens barrels have the large discrepancy between the nominal focal length and the effective focal length enough not to ignore the problem given above.

Figure 1A:
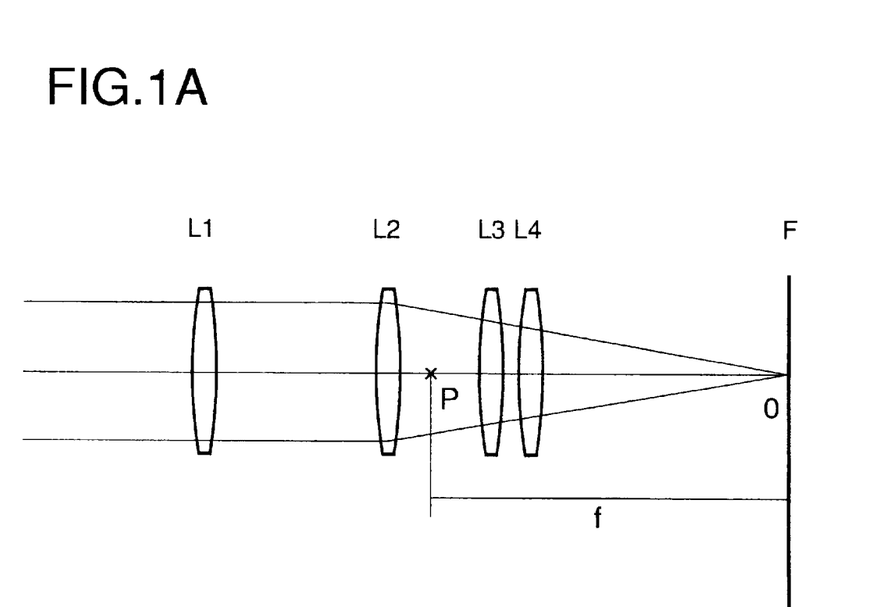
FIGS. 1A and 1B are conceptual diagrams of assistance in explaining an effective focal length.
Figure 1B:
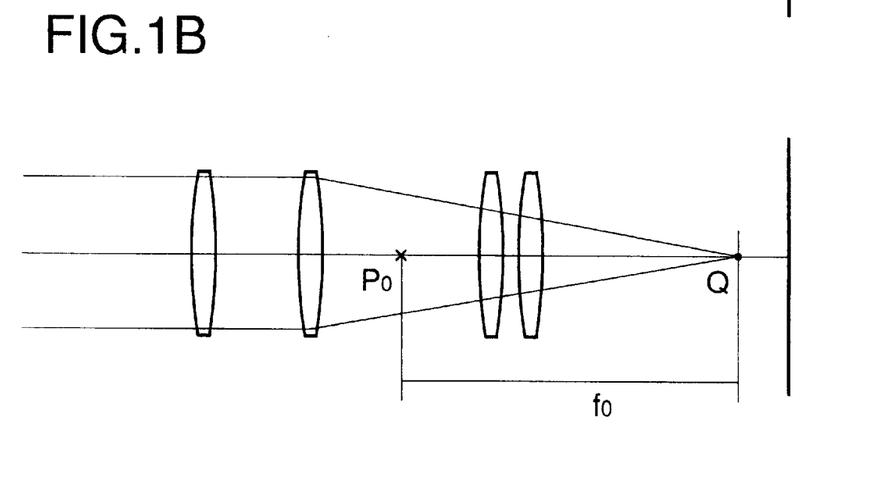

This will be explained by exemplifying the zoom lens barrel with reference to FIGS. 1A and 1B. The zoom lens barrel is constructed of four lens units L1, L2, L3 and L4. When the zoom lens barrel focalizes an object at the infinity and a certain zoom ratio, and, when the lens units L1, L2, L3 and L4 are disposed in positions as shown in FIG. 1A, the nominal focal length is a distance f between a principal point P and a focal point 0 on a film surface F.

The lens unit L2 for focusing is moved in the optical-axis direction, i.e., toward the object to focalized on the object existing in a position far at a certain finite distance at the above zoom ratio. Thereupon, the lens units L1, L2, L3 and L4 are disposed in the positions as shown in FIG. 1B. At this time, an image of the object at the finite distance is formed on the film surface F. On the other hand, the parallel light beams from the object at the infinity intersect the optical axis at a point Q on the optical axis. The effective focal length is a distance $f_o$ between the principal point $P_o$ and the point Q according to the above layout of the lens units.

The effective focal length is substantially coincident with the nominal focal length in the normal lens barrel. Some of newly developed high-performance zoom lens barrels, however, have a large discrepancy between the nominal focal length and the effective focal length.

Table 1 shows an example of calculations in two kinds of Lens barrels, i.e., a lens barrel (1) and a lens barrel (2). The lens barrel (1) is classified as a 35 to 105 mm inner focus type high-performance zoom lens barrel developed in recent years and constructed of four lens units consisting of thirteen lens elements, this lens barrel being disclosed in Japanese Patent Application Laid-Open No. 5-142475. The lens barrel (2) is a prior art front element extension type focusing zoom lens barrel constructed of four lens units, i.e., a first lens unit for focusing, a second lens unit for zooming, a third lens unit and a fourth fixed lens unit.

TABLE 1

|     | f   | R     | β     | $\beta_r$ | $1_r$  | 1      | r   |
|-----|-----|-------|-------|-------|--------|--------|-----|
| (1) | 35  | 1.135 | 0.031 | 0.033 | 655.45 | 701.43 | 107 |
|     | 35  | 0.850 | 0.041 | 0.045 | 480.67 | 525.30 | 109 |
|     | 105 | 2.908 | 0.036 | 0.033 | 655.45 | 599.05 | 91  |
|     | 105 | 0.850 | 0.124 | 0.107 | 202.15 | 175.10 | 87  |
| (2) | 80  | 2.771 | 0.029 | 0.033 | 655.45 | 749.21 | 114 |
|     | 80  | 1.500 | 0.053 | 0.070 | 309.00 | 405.56 | 131 |
|     | 200 | 6.219 | 0.032 | 0.033 | 655.04 | 672.58 | 103 |
|     | 200 | 1.500 | 0.133 | 0.170 | 127.24 | 162.23 | 127 | f: nominal focal length [mm],
R: photographic distance [m],
β: photographic magnification using nominal focal length f,
$\beta_r$: actual photographic magnification,
1: field range [mm]using the nominal focal length f,
$1_r$: actual field range [mm],
r: $1/1_r \times 100$ The prior art lens barrel (2) has a small discrepancy between the nominal focal length and the effective focal length, and hence there is substantially no problem if the photographic magnification $\beta$ and the field range 1 use the nominal focal length. In Table 1, r is a value given by $1/1_r \times 100$, and $1_r$ represents an actual field range. When the r value is 100 or greater, this implies that no problem arises in terms of controlling, e.g., an electronic flash irradiation angle.

While in the lens barrel (1), there is a large discrepancy between the nominal focal length and the effective focal length. Accordingly, the discrepancy increases when the photographic magnification β and the field range 1 use the nominal focal length. Especially when the nominal focal length is 105 mm, the r-value is under 100. This indicates that a problem is caused in terms of controlling the electronic flash irradiation angle.

SUMMARY OF THE INVENTION

Under such circumstances, it is a primary object of the present invention to provide a lens barrel capable of enhancing an accuracy for controlling an exposure and a light emission of an electronic flash by generating effective focal length data at every photographic distance.

It is another object of the present invention to provide a camera system capable of enhancing the accuracy for controlling the exposure and the light emission of the electronic flash by generating effective focal length data at every photographic distance.

To accomplish the above objects, according to a first aspect of the present invention, a lens barrel having over one or two focusing lens units moving in an optical-axis direction when focusing, comprises a focusing lens unit position detecting device for detecting an optical-axis directional position of the focusing lens unit, and a data memory unit having a storage portion for storing the effective focal length data of the lens barrel that corresponds to the optical-axis directional position of the focusing lens unit, for reading the effective focal length data corresponding to the position of the focusing lens unit that is detected by the focusing lens unit position detecting device from the storage portion and then outputting the same data.

According to a second aspect of the present invention, a lens barrel having over one or two focusing lens units moving in an optical-axis direction when focusing and over one or two zooming lens units moving in the optical-axis direction when zooming, comprises a focusing lens unit position detecting device for detecting an optical-axis directional position of the focusing lens unit, a zooming lens unit position detecting device for detecting an optical-axis directional position of the zooming lens unit, and a data memory unit having a storage portion for storing the effective focal length data of the lens barrel that correspond to the optical-axis directional positions of the focusing lens unit and of the zooming lens unit, for reading, from the storage portion, the effective focal length data corresponding to the positions of the focusing lens unit and of the zooming lens unit that are detected by the focusing lens unit position detecting device and the zooming lens unit position detecting device and then outputting the same data.

According to a third aspect of the present invention, a camera system incorporating a lens barrel having over one or two focusing lens units moving in an optical-axis direction when focusing, and a camera body, comprises a focusing lens unit position detecting device for detecting an optical-axis directional position of the focusing lens unit, a data memory unit having a storage portion for storing the effective focal length data of the lens barrel that corresponds to the optical-axis directional position of the focusing lens unit, for reading, from the storage portion, the effective focal length data corresponding to the position of the focusing lens unit that is detected by the focusing lens unit position detecting device and then outputting the same data, and a camera system control portion for controlling the camera system on the basis of the effective focal length data outputted from the data memory unit.

According to a fourth aspect of the present invention, the camera system is preferably constructed so that the focusing lens unit position detecting device and the data memory unit are incorporated into the lens barrel, while the camera system control unit is incorporated into the camera body.

According to a fifth aspect of the present invention, a camera system incorporating a lens barrel having over one or two focusing lens units moving in an optical-axis direction when focusing and over one or two zooming lens units moving in the optical-axis direction when zooming, and a camera body, comprises a focusing lens unit position detecting device for detecting an optical-axis directional position of the focusing lens unit, a zooming lens unit position detecting device for detecting an optical-axis directional position of the zooming lens unit, a data memory unit having a storage portion for storing the effective focal length data of the lens barrel that correspond to the optical-axis directional positions of the focusing lens unit and of the zooming lens unit, for reading, from the storage portion, the effective focal length data corresponding to the positions of the focusing lens unit and of the zooming lens unit that are detected by the focusing lens unit position detecting device and the zooming lens unit position detecting device and then outputting the same data, and a camera system control portion for controlling the camera system on the basis of the effective focal length data outputted from the data memory unit.

According to a sixth aspect of the present invention, the camera system is preferably constructed so that the focusing lens unit position detecting device, the zooming lens unit position detecting device and the data memory unit are incorporated into the lens barrel, while the camera system control unit is incorporated into the camera body.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

One embodiment of a camera system of the present invention will be discussed with reference to FIG. 2.

Figure 2:
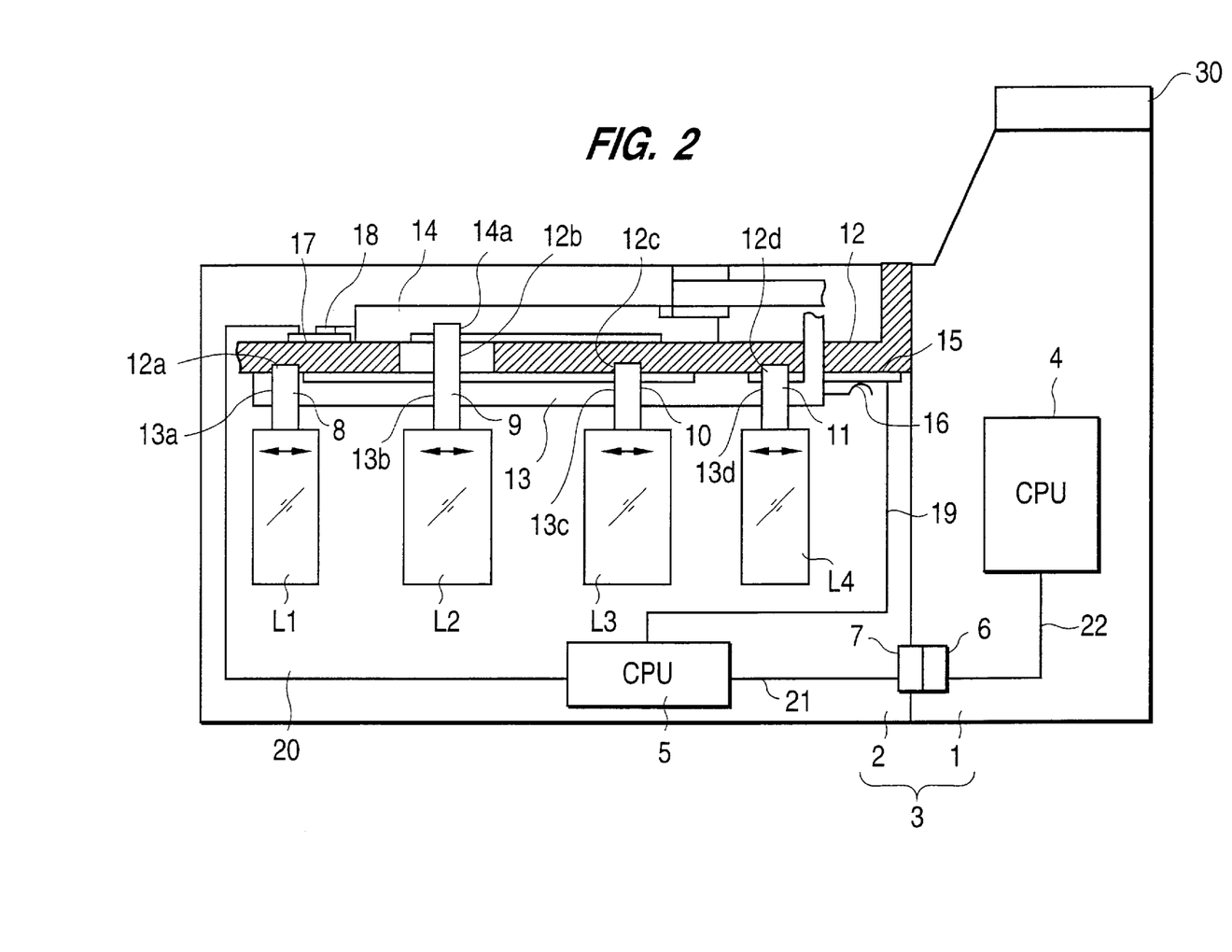
FIG. 2 is a block diagram illustrating a camera system equipped with a four lens unit inner focus type zoom lens barrel in an embodiment.

FIG. 2 is a block diagram showing one embodiment of the camera system in which a lens barrel is attached to a camera body. The lens barrel is the same as the above-described lens barrel (1), i.e., a 35 to 105 mm four-lens-units inner focus zoom lens barrel. The lens barrel is constructed of, sequentially from an object side, a first lens unit L1 having a positive refractive power, a second lens unit L2 having a negative refractive power, a third lens unit L3 having a positive refractive power and a fourth lens unit L4 having a positive refractive power, wherein the whole lens units move along an optical axis toward the object side when zoomed from a wide-angle side to a telescopic side, and the second lens unit L2 moves along the optical axis toward the object side when focusing.

The lens barrel 2 is detachably attached to the camera body 1, thus constituting a camera system 3. CPUs 4 and 5 are incorporated respectively into the camera body 1 and the lens barrel 2 and electrically connected to each other via contacts 6 and 7.

The CPU 4 executes storing, calculating and controlling operations. The CPU 4 performs especially a photometric calculation based on a calculated value of a photographic magnification, and controls an electronic flash irradiation angle based on a calculated value of a field range.

The CPU 5 includes a memory stored with an item of effective focal length data determined by a zoom ratio and a photographic distance, and stores and calculates various items of lens data.

The lens units L1, L2, L3 and L4 constituting an optical system of the lens barrel 2 are respectively supported by a support frames 8, 9, 10 and 11.

A zoom cam drum 13 is so fitted to an internal peripheral portion of a fixed drum 12 of the lens barrel 2 as to be rotatable through a predetermined angle and movable in the optical-axis direction. Further, a focus rotary drum 14 is rotatably fitted to an outer peripheral portion of the fixed drum 12. The support frames 8, 9, 10 and 11 engage with corresponding cam grooves 13a, 13b, 13c and 13d formed in the zoom cam drum 13 and also with guide grooves 12a, 12b, 12c and 12d formed in the fixed drum 12. Further, a support frame 9 engages with a focusing cam groove 14a formed in the focus rotary drum 14.

A pattern 15 is fixedly provided on the fixed drum 12, while a brush 16 is fixedly provided on the zoom cam drum 13. The pattern 15 and the brush 16 are slidably in contact with each other and thus constitute an encoder for detecting a moving quantity of the zoom cam drum 13 in the optical-axis direction with respect to the fixed drum 12.

A pattern 17 is fixedly provided on the fixed drum 12, while a brush 18 is fixedly provided on the focus rotary drum 14. The pattern 17 and the brush 18 are slidably in contact with each other and thus constitute an encoder for detecting an angle of rotation of the focus rotary drum 14 with respect to the fixed drum 12. A position of the lens unit L2 is obtained from the detected angle of rotation.

The patterns 15 and 17 are connected to the CPU 5 respectively via lead wires 19 and 20. The CPU 5 is connected to the CPU 4 via lead wires 21, 22 and contacts 6, 7 as well.

Next, a zooming operation will be explained. When the zoom cam drum 13 is rotated, the zoom cam drum 13 moves in the optical-axis direction while being rotated, while the support frames 8, 9, 10 and 11 move along the cam grooves 13a, 13b, 13c, 13d of the zoom cam drum 13 and along the guide grooves 12a, 12b, 12c and 12d of the fixed drum 12. The four lens units L1, L2, L3 and L4 supported respectively by the support frames 8, 9, 10 and 11 move a predetermined distance in the optical-axis direction, thus executing the zooming.

The brush 16 moves in the optical-axis direction integrally with the zoom cam drum 13 and slides on the pattern 15. Hence, an optical-axis directional moving quantity of the zoom cam drum 13 is detected, and data about this quantity is transmitted via the lead wire 19 to the CPU 5. Optical-axis directional moving quantities of the lens units L1, L2, L3 and L4 of the zoom cam drum 13 are precalculated, and therefore positions of the lens units L1, L2, L3 and L4 in respective zoom positions with respect to the fixed drum 12, are specified, thereby determining an item of zoom position data.

Next, a focusing operation will be explained. When focus rotary drum 14 is rotated, the support frame 9 moves along the cam groove 14a, extending in the optical-axis direction, of the focus rotary drum 14 and also along the cam groove 13b of the zoom cam drum 13. The lens unit L2 supported by the support frame 9 moves a predetermined distance in the optical-axis direction while rotating, thus performing the focusing.

The brush 18 rotates integrally with the focus rotary drum 14 and slides on the pattern 17. Hence, an angle of rotation of the focus rotary drum is detected, and data about this angle of rotation is transmitted via the lead wire 20 to the CPU 5. An optical-axis directional moving quantity of the lens unit L2 is precalculated, and therefore an optical-axis directional moving quantity of the lens unit L2 in each focus position with respect to the zoom cam drum 13 is measured. Besides, a position with respect to the fixed drum 12 is specified, and an item of photographic distance data is thus determined.

The CPU 5 is previously stored with the effective focus distance data. Based on the zoom ratio data determined from the positions of the lens units L1, L2, L3 and L4 that are detected by the brush 16 and the pattern 15 and on the photographic distance data determined from the position of the lens unit L2 that is detected by the brush 18 and the pattern 17, the CPU 5 reads and outputs the effective focal length data determined by the above two items of data. The thus outputted effective focal length data is transmitted to the CPU 4 via the lead wires 21, 22 and the contacts 6, 7 as well.

The CPU 4 obtains a photographic magnification $\beta$ and a field range 1 by use of the transmitted effective focal length data. Based on the obtained photographic magnification $\beta$, the CPU 4 performs the photometric calculation and controls an exposure. Further, the CPU 4 calculates an electronic flash irradiation angle based on the field range 1 and controls a light emission of an electronic flash 30.

Table 2 shows field ranges and photographic magnifications of the lens barrels (1) and (2) that are calculated by using the effective focal length $f_o$.

TABLE 2

|  | f | R | $f_o$ | $\beta_o$ | $1_r$ | $1_o$ | $r_o$ |
|---|---|---|---|---|---|---|---|
| (1) | 35 | 1.135 | 34.270 | 0.030 | 655.45 | 716.38 | 109 |
|  | 35 | 0.850 | 33.689 | 0.040 | 480.67 | 545.74 | 114 |
|  | 105 | 2.908 | 91.172 | 0.031 | 655.45 | 689.91 | 105 |
|  | 105 | 0.850 | 74.597 | 0.088 | 202.15 | 246.46 | 122 |
| (2) | 80 | 2.771 | 85.757 | 0.031 | 655.45 | 698.91 | 107 |
|  | 80 | 1.500 | 91.812 | 0.061 | 309.00 | 353.39 | 114 |
|  | 200 | 6.219 | 195.271 | 0.031 | 655.04 | 688.87 | 105 |
|  | 200 | 1.500 | 192.330 | 0.128 | 127.24 | 168.69 | 133 | f: nominal focal length [mm],
R: photographic distance [m],
$f_o$: effective focal length [mm],
$\beta_o$: photographic magnification using effective focal length $f_o$,
$1_r$: actual field range [mm],
$1_o$: field range [mm] using effective focal length $f_o$, and
$r_o$: $1_o/1_r \times 100$
$\beta_o$: $f_o/R$
$\beta_o$: photographic magnification using effective focal length, and
$f_o$: effective focal length
$1_o = R \times h/f_o$
$1_o$: field range using effective focal length
$r_o$: $1_o/1_r \times 100$
$r_o$: rate of field range using effective focal length to actual field range Values of $r_o$ are shown in the rightmost column in Table 2. According to Table 2, in the lens barrel (1), each $r_o$ value is 100 or above even when the nominal focal length is 35 mm on the wide-angle side, and even when the nominal focal length f is 105 mm on the telescopic side.

As previously shown in Table 1, in the lens barrel (1), the value of r using the conventional nominal focal length is less than 100 when the nominal focal length is 105 mm. While on the other hand, as shown in Table 2, the value of $r_o$ using the effective focal length is over 100 even when the nominal focal length f is 105 mm on the telescopic side, and an effect owing to the calculation using the effective focal length is recognized. It is incidentally recognized that the value of r is over 100 when the nominal focal length f is 35 mm on the wide-angle side, and the value or $r_o$ based on the calculation using the effective focal length is 100 or larger.

Note that when calculated by using the effective focal length with respect to the lens barrel (2) of the conventional type, as shown in Table 2, the $r_o$ value is recognized to be over 100 in any case.

It is to be noted that the CPU 5 may be constructed to store not only the effective focal length but also the calculated value of the photographic magnification, etc. using the effective focal length. The CPU 4 may be incorporated into the lens barrel 2, or alternatively the CPU 5 may be incorporated into the camera body, or further the CPU 4 and the CPU 5 may also be constructed into a single device.

The zoom lens barrel has been exemplified by way of the embodiment. However, the present invention is, as a matter of course, can be carried out in a single focus lens barrel and a multi-focus lens barrel on the condition that the lens barrel has a large discrepancy between the nominal focal length and the effective focal length.

Note that the lens barrel may or may not be detachably attached to the camera body in the camera system.

According to the present invention, the effective focal length data is stored, and it is possible to control the exposure and the light emission of the electronic flash 30 on the basis of the field range and the photographic magnification calculated by use of the above data. There is thereby eliminated such a possibility that an underexposure occurs because of the electronic flash irradiation light quantity being too small, or that the underexposure occurs in the peripheral portion as compared with the central portion due to a deficiency in terms of the light quantity of the peripheral portion because of an electronic flash irradiation angle being small. Then, the object at an arbitrary photographic distance is photographed as a neat picture by receiving a sufficient amount of light at every corner of the field.

It is apparent that, in this invention, a wide range of different working modes can be formed based on the invention without deviating from the spirit and scope of the invention. This invention is not restricted by its specific working modes except being limited by the appended claims.

What is claimed is:

1. A camera system including a lens barrel having focusing lens units that move along an optical axis, comprising:

a detecting device to detect positions of said focusing lens units along the optical axis;

a generating device to generate effective focal length data of said lens barrel, different from nominal focal length data, from the detected positions, an effective focal length being a focal length of lenses in a focused state at every photographic distance and varying in accordance with the photographic distance; and a calculating device to perform a photometric calculation from the generated effective focal length data.

2. A camera system including a lens barrel having focusing lens units that move along an optical axis, comprising:

a detecting device to detect positions of said focusing lens units along the optical axis;

a storage device to store effective focal length data of said lens barrel, different from nominal focal length data, an effective focal length being a focal length of lenses in a focused state at every photographic distance and varying in accordance with the photographic distance;

an output device to output stored effective focal length data corresponding to the detected positions; and a calculating device to perform a photometric calculation from the output effective focal length data.

3. A lens barrel according to claim 2, wherein the effective focal length data is used to control an exposure of a camera attached with said lens barrel.

4. A camera system including a lens barrel having focusing lens units movable along an optical-axis, comprising:

a detecting device to detect positions of said focusing lens units along the optical axis;

a storage device to store effective focal length data of said lens barrel that corresponds to the detected positions, an effective focal length being a focal length of lenses in a focused state at every photographic distance and varying in accordance with the photographic distance;

an output device to output the stored effective focal length data; and a calculating device to perform a photometric calculation from the output effective focal length data, wherein $\beta_o = f_o/R$ $1_o = R \times h/f_o$ $r_o 1_o/1_r \times 100$ where $\beta_o$: photographic magnification $f_o$: effective focal distance R: photographic distance $1_o$: field range h: semi diagonal line length of a photographic surface of a film, and $1_r$: actual field range however, $r_o \geq 100$.

5. A camera system including a lens barrel having focusing lens units and zooming lens units that move along an optical axis of the lens barrel, comprising:

a focus detecting device to detect positions of said focusing lens units along the optical axis;

a zoom detecting device to detect positions of said zooming lens unit along the optical axis;

a storage device to store effective focal length data of said lens barrel, different from nominal focal length data, an effective focal length being a focal length of lenses in a focused state at every photographic distance and varying in accordance with the photographic distance;

an output device to output stored effective focal length data corresponding to the detected positions of said focusing lens units and said zooming lens units; and a calculating device to perform a photometric calculation from the output effective focal length data.

6. A lens barrel according to claim 5, wherein the output effective focal length data are used to control an exposure of a camera attached with said lens barrel.

7. A lens barrel according to claim 5, wherein the output effective focal length data are used to control an electronic flash connected to said lens barrel.

8. A camera system including a lens barrel having focusing lens units and zooming lens units moving along an optical-axis of the lens barrel, comprising:

a focus detecting device to detect positions of said focusing lens units along the optical axis;

a zoom detecting device to detect positions of said zooming lens unit along the optical axis;

a storage device to store effective focal length data of said lens barrel that correspond to the detected positions, an effective focal length being a focal length of lenses in a focused state at every photographic distance and varying in accordance with the photographic distance;

an output device to output the stored effective focal length data; and a calculating device to perform a photometric calculation from the output effective focal length data, wherein $\beta_o = f_o/R$
$1_o = R \times h/f_o$
$r_o = 1_o/1_r \times 100$ where $\beta_o$: photographic magnification $f_o$: effective focal distance R: photographic distance $1_o$: field range h: semi diagonal line length of a photographic surface of a film, and $1_r$: actual field range however, $r_o \leq 100$.

9. A camera system incorporating a lens barrel having focusing lens units that move along an optical axis, said system comprising:

a detecting device to detect positions of said focusing lens unit;

a storage device to store effective focal length data of said lens barrel, different from nominal focal length data, an effective focal length being a focal length of lenses in a focused state at every photographic distance and varying in accordance with the photographic distance;

an output device to output stored effective focal length data corresponding to the detected positions; and a control device to control said camera system on the basis of the output effective focal length data.

10. A camera system according to claim 9, wherein the output effective focal length data is used to control an exposure.

11. A camera system according to claim 9, wherein the output effective focal length data is used to control an electronic flash.

12. A camera system according to claim 9, wherein said detecting device, said storage device and said output device are provided in said lens barrel, while said control device is provided in said camera body.

13. A camera system incorporating a lens barrel having focusing lens units moving along an optical-axis, and a camera body, said camera system comprising:

a detecting device to detect positions of said focusing lens unit;

a storage device to store effective focal length data of said lens barrel that corresponds to the detected positions, an effective focal length being a focal length of lenses in a focused state at every photographic distance and varying in accordance with the photographic distance;

an output device to output the stored effective focal length data; and a control device to control said camera system on the basis of the output effective focal length data, wherein $\beta_o = f_o/R$
$1_o = R \times h/f_o$
$r_o = 1_o/1_r \times 100$ where $\beta_o$: photographic magnification $f_o$: effective focal distance R: photographic distance $1_o$: field range h: semi diagonal line length of a photographic surface of a film, and $1_r$: actual field range however, $r_o \leq 100$.

14. A camera system incorporating a lens barrel having focusing lens units and zooming lens units that move along an optical axis of the lens barrel, said camera system comprising:

a focus detecting device to detect positions of said focusing lens unit along the optical axis;

a zoom detecting device to detect positions of said zooming lens unit along the optical axis;

a storage device to store effective focal length data of said lens barrel, different from nominal focal length data, an effective focal length being a focal length of lenses in a focused state at every photographic distance and varying in accordance with the photographic distance;

an output device to output stored effective focal length data corresponding to the detected positions of the focusing lens units and the zooming lens units; and a control device to control said camera system on the basis of the output effective focal length data.

15. A camera system according to claim 14, wherein the output effective focal length data are used for controlling an exposure.

16. A camera system according to claim 14, further comprising:

an electronic flash, wherein the output effective focal length data are used for controlling said electronic flash.

17. A camera system according to claim 14, wherein said focus detecting device, said zoom detecting device, said storage device and said output device are provided in said lens barrel, while said control device is provided in said camera body.

18. A camera system incorporating a lens barrel having focusing lens units and zooming lens units moving along an optical-axis of the lens barrel, and a camera body, said camera system comprising:

a focus detecting device to detect positions of said focusing lens unit along the optical axis;

a zoom detecting device to detect positions of said zooming lens unit along the optical axis;

a storage device to store effective focal length data of said lens barrel that correspond to the detected positions, an effective focal length being a focal length of lenses in a focused state at every photographic distance and varying in accordance with the photographic distance;

an output device to output the stored effective focal length data; and a control device to control said camera system on the basis of the output effective focal length data, wherein $\beta_o = f_o/R$
$1_o = R \times h/f_o$
$r_o = 1_o/1_r \times 100$ where $\beta_o$: photographic magnification $f_o$: effective focal distance R: photographic distance $1_o$: field range h: semi diagonal line length of a photographic surface of a film, and $1_r$: actual field range however, $r_o \geq 100$.

19. A camera system incorporating a lens barrel having moveable focusing lens units, comprising:

means for detecting relative positions of the focusing lens units;

means for generating an effective focal length that varies with the detected relative positions, the effective focal length being a focal length of lenses in a focused state at every photographic distance and varying in accordance with the photographic distance; and means for controlling said camera system based on the generated effective focal length.

20. A camera system incorporating a lens barrel that includes focusing lens units, comprising:

a generating device to generate effective focal length data of said lens barrel corresponding to relative positions of the focusing lens groups at a plurality of photographic distances, an effective focal length being a focal length of lenses in a focused state at every photographic distance and varying in accordance with the photographic distance; and a calculating device to perform a photometric calculation from the generated effective focal length data for each of the plurality of photographic distances.

21. A camera system incorporating a lens barrel that includes focusing lens units, comprising:

a generating device to generate an effective focal length corresponding to a relative position of the focusing lens units, the effective focal length being a focal length of lenses in a focused state at every photographic distance and varying in accordance with the photographic distance; and a calculating device to calculate a photographic magnification and a field range, based on the generated effective focal length, to control an exposure and an electronic flash irradiation angle, wherein the effective focal length varies with changes in the relative position of the focusing lens units.

* * * * *

UNITED STATES PATENT AND TRADEMARK OFFICE
CERTIFICATE OF CORRECTION

PATENT NO.: 5,956,530
DATED : September 21, 1999
INVENTOR(S): Koushi Yoshibe, et al.

It is certified that error appears in the above-identified patent and that said Letters Patent is hereby corrected as shown below:

Title Page   [56] change "6/ 1996 to --9/1996--;

Column 8,   line 30, (claim 4), after "$r_o$" insert --=--.

Signed and Sealed this

Ninth Day of May, 2000

Q. TODD DICKINSON

Attest:

Attesting Officer

Director of Patents and Trademarks

UNITED STATES PATENT AND TRADEMARK OFFICE
CERTIFICATE OF CORRECTION

PATENT NO.: 5,956,530
DATED : September 21, 1999
INVENTOR(S): Koushi Yoshibe, et al.

It is certified that error appears in the above-identified patent and that said Letters Patent is hereby corrected as shown below:

Title Page    [56] References Cited
U.S. PATENT DOCUMENTS
change "5,522,847 6/1996" to -- 5,552,847 9/1996--;

Signed and Sealed this

Sixth Day of June, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,956,530
DATED : September 21, 1999
INVENTOR(S) : Koushi Yoshibe et al.

It is certified that error appears in the above-identified patent and that said Letters Patent is hereby corrected as shown below:

Title page,
Item [56], References Cited, U.S. PATENT DOCUMENTS, change "5,522,847" to -- 5,552,847 --; and change "6/1996" to -- 9/1996 --;

Column 8,
Line 30, after "$r_0$" insert -- = --.

Signed and Sealed this

Twenty-eighth Day of December, 2004

JON W. DUDAS
*Director of the United States Patent and Trademark Office*